United States Patent [19]

Morrin, II

[11] 4,005,411
[45] Jan. 25, 1977

[54] COMPRESSION OF GRAY SCALE IMAGERY TO LESS THAN ONE BIT PER PICTURE ELEMENT

[75] Inventor: Thomas Harvey Morrin, II, San Jose, Calif.

[73] Assignee: International Business Machines Corporation, Armonk, N.Y.

[22] Filed: Dec. 30, 1974

[21] Appl. No.: 537,164

[52] U.S. Cl. .................. 340/347 DD; 178/DIG. 3; 325/38 B
[51] Int. Cl.² ...................................... H03K 13/22
[58] Field of Search ............ 325/38 B; 178/DIG. 3; 340/347 DD; 235/154; 332/11 D

[56] References Cited
UNITED STATES PATENTS

| | | | |
|---|---|---|---|
| 3,569,834 | 3/1971 | DeBart | 325/38 |
| 3,679,821 | 7/1972 | Schroeder | 178/6 |
| 3,689,840 | 9/1972 | Brown et al. | 325/38 B |
| 3,720,786 | 3/1973 | Cutler | 178/7.1 |
| 3,769,451 | 10/1973 | Connor | 178/6 |

OTHER PUBLICATIONS
Def. Pub.: T928,003, Bahl et al., Nov. 5, 1974.

Primary Examiner—Charles D. Miller
Attorney, Agent, or Firm—Otto Schmid, Jr.; R. Bruce Brodie

[57] ABSTRACT

In a continuous tone image approximated by a two-dimensional array of gray scale coded points, more than one bit per picture element is required. Compression coding consists firstly of delta coding sequences representative of the successive scan lines of the continuous tone image and secondly applying them to a predictive encoder having a particular transfer function and thirdly run-length encoding the error image. Central to the invention is the observation that delta coded sequences of gray scale pel values along a given scan line having a high expectancy of alternating, i.e. 101010. Also, the gray scale trend in the ith scan line is expected to be the same as the trend of the ith - 1 scan line. Relatedly, gray scale image expansion is achieved by applying the compressed image to a run-length decoder, a predictor stage, and delta decoder.

6 Claims, 6 Drawing Figures

GRAY SCALE IMAGE COMPRESSION

GRAY SCALE IMAGE COMPRESSION

GRAY SCALE IMAGE EXPANSION

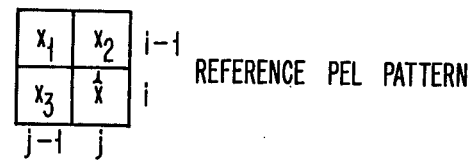

REFERENCE PEL PATTERN $\quad \overset{1}{x} = \bar{x}_3 x_2 + \bar{x}_3 x_1 + x_1 x_2$

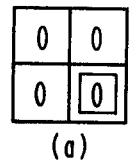
(a)

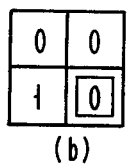
(b)

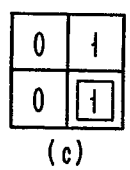
(c)

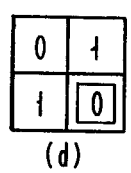
(d)

| FIG. | $\overset{1}{x}$ | $x_1$ | $x_2$ | $x_3$ |
|---|---|---|---|---|
| 2a | 0 | 0 | 0 | 0 |
| 2b | 0 | 0 | 0 | 1 |
| 2c | 1 | 0 | 1 | 0 |
| 2d | 0 | 0 | 1 | 1 |
| 2e | 1 | 1 | 0 | 0 |
| 2f | 0 | 1 | 0 | 1 |
| 2g | 1 | 1 | 1 | 0 |
| 2h | 1 | 1 | 1 | 1 |

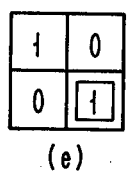
(e)

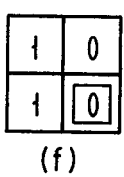
(f)

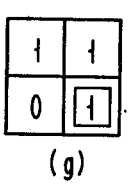
(g)

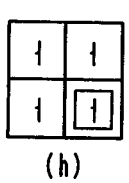
(h)

3rd ORDER PEL PREDICTION

FIG. 2

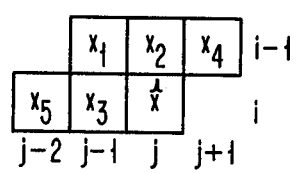

REFERENCE PEL PATTERN $\quad \overset{1}{x} = \bar{x}_3 x_2 + x_1 x_2 \overline{(\bar{x}_4 x_5)} + x_1 \bar{x}_3 \overline{(\bar{x}_4 x_5)}$
$\qquad\qquad\qquad\qquad\qquad + (x_2 + x_3) x_1 \overline{(\bar{x}_4 x_5)}$
$\qquad\qquad\qquad\qquad\qquad + x_4 \bar{x}_5 (x_2 x_3 + \bar{x}_2 \bar{x}_3)$

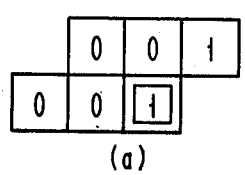
(a)

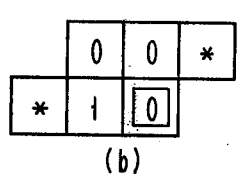
(b)

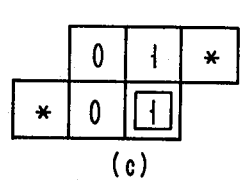
(c)

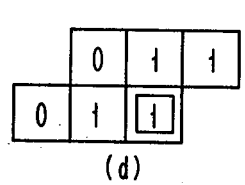
(d)

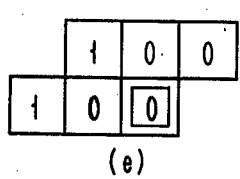
(e)

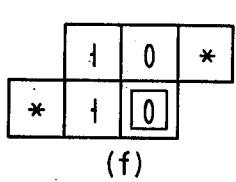
(f)

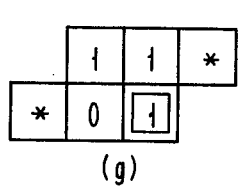
(g)

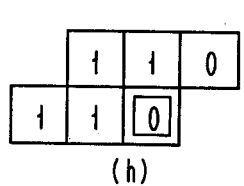
(h)

5th ORDER PEL PREDICTION

FIG. 3

\* = DON'T CARE FOR COMBINATIONS OF $x_4 x_5$ NOT SHOWN CORRESPONDING LETTERED FIGS. IN FIG. 2 GOVERN x OUTPUT.

3 PEL PREDICTOR

5 PEL PREDICTOR

COMPRESSION OF GRAY SCALE IMAGERY TO LESS THAN ONE BIT PER PICTURE ELEMENT

BACKGROUND OF THE INVENTION

This invention relates to an improvement in the compression of delta coded sequences representative of successive scan lines of a continuous tone image.

In the prior art, J. S. Wholey (IRE Transactions on Information Theory, April 1961, pages 99–104) pointed out that compression would result if the binary threshold-encoded elements of successive scan lines of graphical images were applied to a predictive encoder. Wholey further pointed out, at page 100, that a run-length code could always be found for coding the predictor output. It is to be recalled that the generic predictive encoding compression technique was introduced by P. Elias (IRE Transactions on Information Theory, March 1955, at pages 16–33). Relatedly, R. E. Graham in U.S. Pat. No. 2,905,756, "Method and Apparatus for Reducing Television Bandwidth" Sept. 22, 1959) applied predicitive encoding to the threshold-encoded elements of successive television scan lines. The term "threshold encoding" was taken to mean resolving each picture element independently as having either a black or a white picture value.

The question naturally arises as to how may one encode images having tones between black and white. If a scan represents continuum of values, then differential encoding can be used. Relatedly, Armin H. Frei in "An Adaptive dual mode Coder/Decoder for Television Signals", IEEE Trans. on communications Technology, December 1971, pages 933–944, points out at page 934 that early attempts to encode video information consisted in sampling the video signal at the Nyquist rate and in coding 64 gray levels by means of 6 binary digits per pel. Later, differential PCM was introduced and where the video waveform was relatively smooth, it was feasible to operate a coder in the delta mode producing one bit per pel.

SUMMARY OF THE INVENTION

It is accordingly an object of this invention to devise a system for compressing gray scale imagery to less than one bit per picture element. This object is achieved by a system for compressing delta modulation image information by first predictive and then run-length encoding. Delta modulation techniques produce binary data representing gray scale images at exactly one bit per picture element. For example, a delta coded 1 bit indicates that the gray level is increasing, while a 0 is indicative that the level is being reduced. In most areas of a typical image, the gray level does not change rapidly. Therefore, adjacent delta modulation bits in a line tend to be complementary. A prediction is based upon the preceding bit and the two bits vertically adjacent to the preceding bit and the prediction bit. If the prediction is correct, a 0 is recorded. If the prediction bit is incorrect, a 1 is recorded. The resultant recorded bits comprise substantial strings of zeros and are then run-length encoded.

In particular, the invention resides in an apparatus for compressing an mxn array of delta coded points obtained from the delta coding of the successive scan lines of a continuous tone image. The location of each point in the array is defined as an ordered pair $(i,j)$ over the range $0 \leq i \leq m$ and $0 \leq j \leq n$. The apparatus comprises means (1,3) for generating the delta coded values $x$ of the array in row major order; an exhaustive non-linear predictor stage (14), responsive to the delta coded values $x$ for predicting a value $\bar{x}$ at array location $(i,j)$ based upon previous values $x_1, x_2, x_3$ at corresponding locations $(i-1,j-1)$, $(i-1,j)$, $(i,j-1)$ according to the relation:

$$\bar{x} = \bar{x}_3 x_2 + \bar{x}_3 x_1 + x_1 x_2;$$

means (25) for correlating the actual value $x$ and the predicted value $\bar{x}$ according to the relation $y = x \oplus \bar{x}$; and means (29) for variable length encoding runs of like consecutive values of $y$.

As is apparent, the delta coding produces binary data representing gray scale pels at exactly one bit per pel. The resulting array of delta coded points is compressed by redistributing the statistics of run lengths such as to increase the expectancy of longer runs. This "predictive encoding" is followed by any suitable form of variable length coding in order to achieve compression. Since each delta coded point represents 1 bit per pel, compression to less than that amount results from the apparatus and method of the invention.

BRIEF DESCRIPTION OF THE DRAWING

FIGS. 2 and 3 show third- and fifth-order pel prediction patterns according to the invention.

DESCRIPTION OF THE PREFERRED EMBODIMENT

In encoding a gray scale image to exactly one bit per picture element using delta modulation, how can one compress such bit streams? Delta modulation involves incrementing or decrementing the present encoded gray level by some amount based upon a comparison with the actual gray level. The method involves an approximation of the actual image in that the gray scale image is not exactly reproduceable from the encoded data. Some sophisticated techniques allow the encoded gray level to be incremented or decremented by a variable amount based upon the value of the present pel and some number of previous pels or even pels on the previous raster scan line of the image. The issue of compression is resolvable by identifying further redundancy at the output of the delta encoder.

It was unexpectedly observed that if one examined the encoded data set from a delta encoder in a bit plane format, then one could invariably discern the pattern of the original image. In this regard, a bit plane format refers to the original image with each gray value replaced with a black or a white picture element, depending on the output of the delta modulator. This fact alone implies that there are still redundancies in the encoded data set. There are two primary sources of redundancy. First, a sequence of 1's or 0's indicates an edge in the original gray scale image. The edge is likely to repeat itself in the next scan line. A predictor that looks at the previous scan line can take advantage of this. It is this edge information that may be discerned by eye in the Δ coded output. Secondly, there exists a high a priori probability that two adjacent pels in a rastered scan line will be delta coded as complements of each other. This is due to the fact that the expected value of a gray scale picture element is close to the gray value of the previous picture element. As is apparent, a delta modulator tends to flip back and forth between zero and one in regions of uniform gray level.

As a result of these considerations, it was theorized that those predictor/run-length encoder which were developed for "sparse" black/white images would be applicable to delta modulator outputs if modified to accommodate the expectation of alternating 1's and 0's. One example of predictor/run-length encoders developed for "sparse" black/white images may be found in Kobayashi and Bahl, "Image Data Compression By Predictive Coding", *IBM Journal of Research and Development*, March 1974, pages 164–179, especially at page 165. Another example of such a "sparse" system may be found in R. B. Arps, U.S. Pat. No. 3,813,4185, "System for Compression of Digital Data," filed Jan. 5, 1972.

Figure 1A:
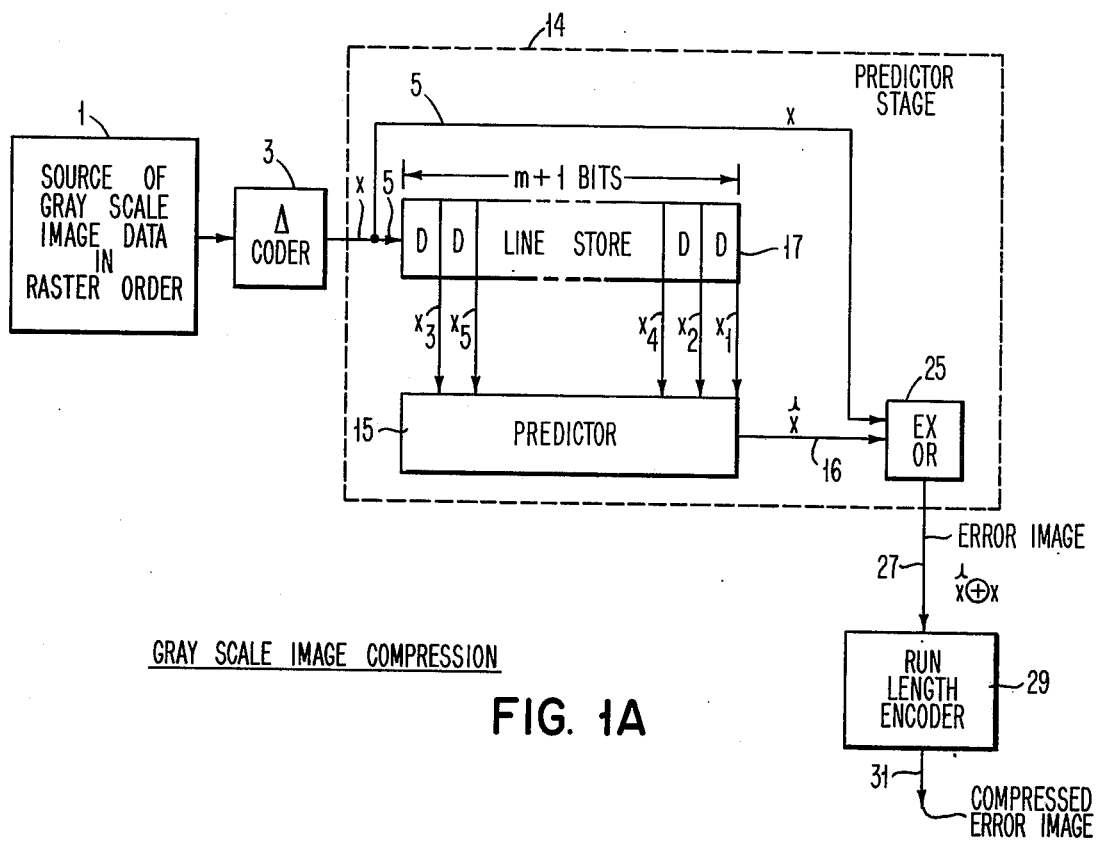
FIGS. 1A and B are logical block diagrams representatively embodying the invention and respectively depicting gray scale image compression and expansion.

Referring now to FIG. 1A, there is shown a logical embodiment of gray scale image compression. A source 1 of gray scale image data in raster order is applied to a delta modulator encoder 3. Any analog-to-digital converter which would supply a numerically coded equivalent to a gray scale value for each consecutive picture element scanned in row major order would be sufficient.

The delta modulation encoder 3 shown, for example, in H. R. Schindler, U.S. Pat. No. 3,699,566, "Delta Coder," issued Oct. 17, 1972, describes the type of digital encoding which encodes only the variation in the level between two successive sampling instants. In addition to the delta coder shown in FIG. 1 of the Schindler reference, a delta decoder is set forth in FIG. 3.

As Schindler points out, a delta modulation system is one in which each sample is compared to a reference and the relative magnitude is encoded as one of only two binary levels. The sample magnitude is compared to the previously considered level. The binary level is indicative of whether the input is being approximated by positive or negative steps. Accordingly, the encoder sends a binary 1 in the case of the negative-going approximation and binary 0 in the case of a positive-going approximation. For a constant input, that is, one with successive differences of zero, the encoder will characteristically produce an alternating output 101010, this corresponds to regions of constant tone, i.e. constant gray level.

The bit stream output $x$ from delta coder 3 is applied to predictor stage 14 over path 5. The output of stage 14 consists of a so-called correlated error image $x \oplus \hat{x}$. It is applied over path 27 to run-length encoder 29. Note, it is to be understood that the function of the predictor stage is to change the statistical distribution of run lengths in the correlated error image $x \oplus \hat{x}$ by increasing the frequency of long runs of zeros. The runs of consecutive zeros can then be conveniently compressed with a suitable run-length encoder.

The predictor stage comprises a line store A formed from a shift register serially storing $n+1$ bits of delta coded data, where $n$ is the number of bits in a raster scan line. The line store is tapped at predetermined points along its extent so that its contents may be applied to predictor 15. Parenthetically, predictor 15 may be either of the three-pel or five-pel variety as logically embodied in FIGS. 4A and B. The correlated error image is formed by exclusive OR gate 25 from the joint input of each delta coded bit $x$ on path 5 and its predicted value $\hat{x}$ on path 16.

Figure 1B:
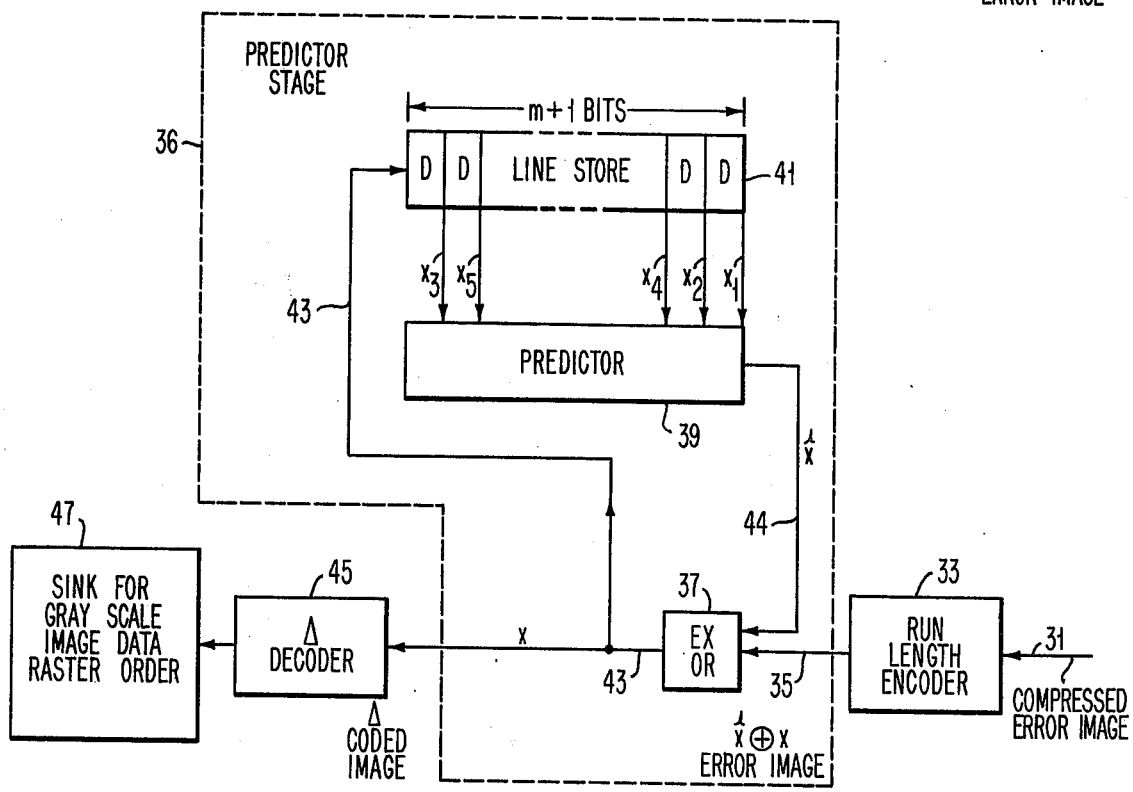

Referring now to FIG. 1B there is shown the logical embodiment of a gray scale image expander. The compressed error image is applied in raster scan order to run-length decoder 33. This yields the expanded correlated error image $x \oplus \hat{x}$. This is applied to the predictor stage 36 over path 35. The output of predictor stage 36 in raster scan line order is the delta coded values $x$ applied to delta decoder 45 over path 43. Delta decoder 45 integrates successive delta values in order to provide gray scale image data. Now, the output from the delta decoder as shown in FIG. 3 of the Schindler patent may be converted into a binary digital value for storage, for example, in a serially readable buffer. Both the analog-to-digital encoding and buffering are incorporated in element 47. In this regard neither source 1 nor sink 47 constitute elements of this invention.

Referring again to FIG. 1A, consideration should be given to the nature of the predictor stage 14 and the run-length encoder 29. The predictive stage utilizes an nth order exhaustive, causal predictor which looks at adjacent points of previous scan lines and preceding points of present scan lines to predict the binary value that delta coder 3 ought to generate. This is compared with the actual delta coder binary $x$ Exclusive OR gate 25. If the prediction is in error, that is, if $\hat{x}$ and $x$ mismatch, than a binary 1 is transmitted on path 27. If there is a match, then a binary 0 is applied to path 27. If the prediction algorithm is accurate for a substantial fraction of the time, then long runs of zeros can be expected on path 27.

Run-length encoder 29 and decoder 33 may be of the extended run-length code variety such as, for example, shown respectively in FIGS. 2 and 4 of R. B. Arps, U.S. Pat. No. 3,813,485. This run length encoder is of the type which uses variable length words, with subword length L related to a dual-based counting system such that $L = \log_2(p+r)$ bits, where $p$ equals the number of states in the lower order subwords; and $r$ equals the number of states in successive higher and highest order subwords. Alternatively, the run lengths may be Huffman encoded according to the Kobayashi et al reference at pages 174–179. This run length encoder is of the type where the length of the instantaneous Hoffman integer valued code word is inversely proportional to the logarithm of the frequency of occurrence of runs of any given length. Given that the delta coded output of 1 bit per picture element, it can now be seen that by predictive coded results in a larger number of long run lengths. It is possible to take advantage of the compression efficiency of run-length encoding. A compression of between 1.5 and 2.0 is achievable using the method and apparatus of this invention. Illustratively, without the invention $pq$ bits of memory would be required to store a $p \times q$ two-dimensional array of delta coded points. Utilizing the invention, only $pq/2$ bits of memory are needed.

Referring now to FIG. 2 taken together with FIG. 1A, attention is first directed to the reference pel pattern. For a three-pel predictor, according to this invention, $x_1$ and $x_2$ refer to the delta coded values in the $i$th $-$ 1 scan line respectively in the $j-1$ and $j$ pel positions while $x_3$ and $x$ in the ith scan line represent the delta coded values of the $j-1$ and $j$ pel positions. It is a significant aspect of the invention, that $\hat{x}$ is related to $x_1$, $x_2$, and $x_3$ according to the relation:

$\bar{x} = \bar{x}_3 x_2 + \bar{x}_3 x_1 + x_1 x_2.$

Figure 4A:
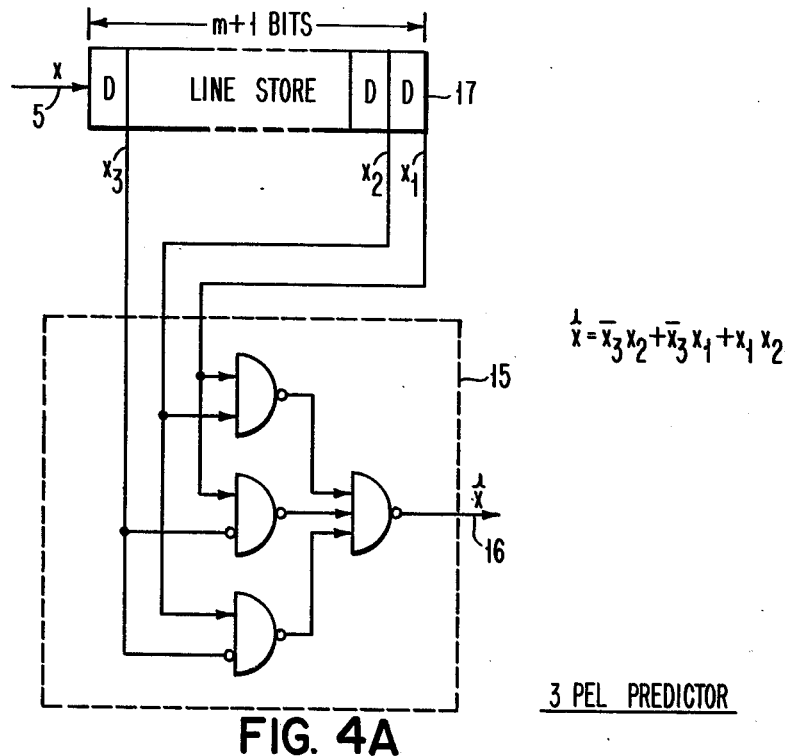
FIGS. 4A and B illustrate logical embodiments of the third- and fifth-order pel predictors.

As s shown on the accompanying table, each of the pel patterns 2A-H defined by elements $x_1 x_2 x_3$ have associated therewith a corresponding predictive value. Now, in relating the reference pel pattern to the values contained in line store 17, it will be observed that $x_3$ is the delta coded value obtained from the immediate preceding clocking cycle, while $x_1 x_2$ are contained in the appropriate positions in the immediately preceding raster scan line. Referring now to FIG. 4A, there is shown a logical embodiment for the three-pel predictor 15 and its connection to line store 17.

Figure 4B:
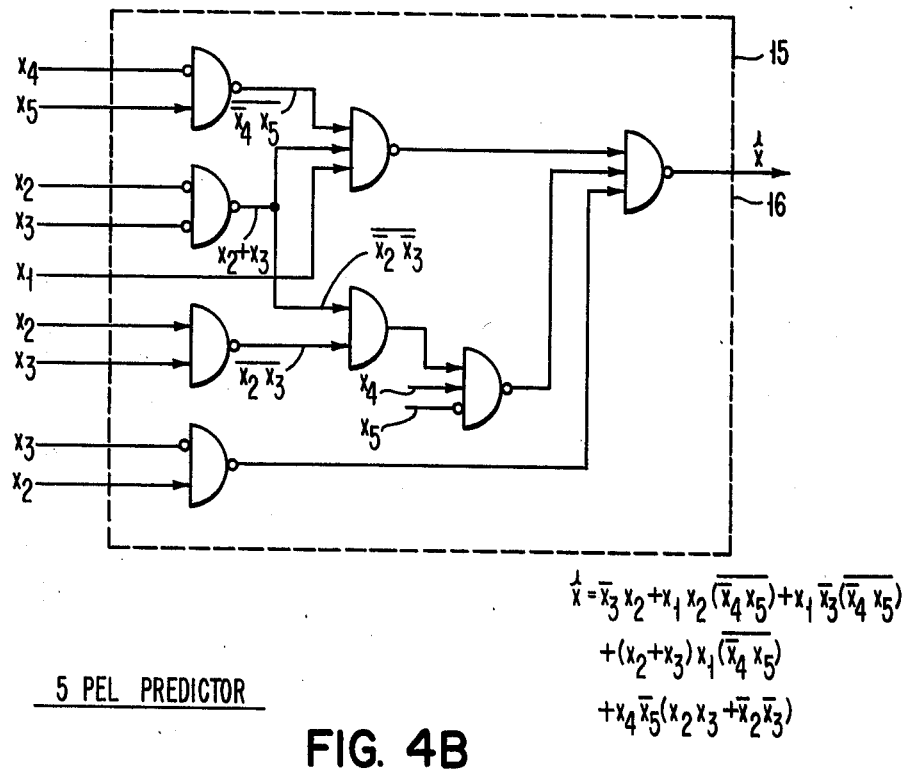

Referring now to FIG. 3, disclosing a fith-order pel predictor, there is shown a reference pel pattern and the relationship between the predicted value $x$ and $x_1$, $x_2$, $x_3$, $x_4$, and $x_5$. The reference pel pattern discloses that three pels, $x_1$, $x_2$, and $x_4$ from the ith − 1 scan line, in pel positions $j-1$, $j$, and $j+1$, together with delta coded values $x_5$ and $x_3$ of the ith scan line in pel positions $j-2$ and $j-1$, respectively, are used to predict $\bar{x}$. As a consequence of the higher order prediction, the population of 1's in the error image should be even further reduced. Reference should be made to FIG. 4B for a logical embodiment of the five-pel predictor according to the invention. Parenthetically, $\bar{x}$ is related to $x_1 \ldots x_5$ according to the relation:

$$\bar{x} = \bar{x}_3 x_2 + x_1 x_2 \overline{(\bar{x}_4 x_5)} + x_1 \bar{x}_3 \overline{(\bar{x}_4 \bar{x}_5)} + (x_2 + x_3) x_1 \overline{(\bar{x}_4 x_5)} + x_4 \bar{x}_5 (- x_2 x_3 + \bar{x}_2 \bar{x}_3).$$

It will be understood that the predictor stage 14, run-length encoder 29, run-length decoder 33, and predictor stage 36 are synchronous clock driven elements. Thus, during any given clock cycle, a predicted value $\bar{x}$ is generated on line 16 and compared with the delta coded value $x$ on line 5 through Exclusive OR gate 25 with the appropriate correlated error image being applied to run-length encoder on line 29 via path 27.

Of some interest is the fact that the ability to compress and expand delta coded information is limited to a small subset of casual predictor algorithms. Thus, the predictor pattern shown on FIG. 3B of Arps is not operative for error-free compression and expansion with the delta coded gray scale image information.

While the preferred embodiment of the invention including both the method and apparatus have been illustrated and described, different implementations of the disclosed techniques may be preferred by others, and since modifications will naturally occur to those skilled in this art, the invention should not be circumscribed by the disclosed embodiments but, rather, should be viewed in light of the following claims.

What is claimed is:

1. An apparatus for compressing an $m \times n$ array of delta coded points, the location of each point being defined as an ordered pair $(i,j)$ for $1 \leq i \leq m$ and $1 \leq j \leq n$, comprising:
    means (1,3) for generating delta coded values $x$ of the array in row major order;
    an exhaustive non-linear predictor stage (14) comprising a predictor (15-17) and a correlator (25), said predictor (15-17) being responsive to the delta coded values $x$ from the generating means for predicting a value $\bar{x}$ at the array location $(i,j)$ based upon previous values $x_1, x_2, x_3$ at corresponding locations $(i-1,j-1)$, $(i-1,j)$, $(i,j-1)$ according to the relation:

$$X = \bar{x}_3 x_2 + \bar{x}_3 x_1 + x_1 x_2;$$

the correlator generating a value $y$ correlating the acutal $x$ and predicted values $\bar{x}$ according to the relation $y = x \oplus \bar{x}$; and
    means (29) for variable length encoding runs of like consecutive values of $y$ from the correlator.

2. An apparatus for compressing an $m \times n$ array of delta coded points, according to claim 1, wherein the means for generating delta coded values $x$ of the array in row major order include:
    a delta coder (3);
    a source (1) of gray scale image data in raster scan order; and
    means for serially applying consecutive raster scan lines of gray scale data from the source to the delta coder.

3. An apparatus for compressing an m×n array of delta coded points, according to claim 1, wherein the means for variable length encoding runs of like consecutive values of $y$ from the correlator include:
    a run-length encoder (29) using a variable word length which is a multiple of subwords of length L whose $2^L$ possible states are divided into two mutually exclusive, unequal groups such that $L = \log_2(p+r)$ bits, where $p$ is the number of states in the lowest order subwords and $r$ is the number of states in sucessive higher and highest order subwords.

4. An apparatus for compressing an $m \times n$ array of delta coded points, according to claim 1, wherein the means for variable length encoding runs of like consecutive values of $y$ from the correlator include Huffman encoders of the type where the length of the instantaneous Huffman integer valued code word is inversely proportional to the logarithm of the frequency of occurrence of runs of any given length.

5. An apparatus for compressing an $m \times n$ array of delta coded points, the location of each point being defined by an ordered pair $(i,j)$ for $1 \leq i \leq m$ and $1 \leq$ ; $\leq n$; comprising:
    means (1,3) for generating delta coded values $x$ of the array in row major order;
    an exhaustive non-linear predictor stage (14) comprising a predictor (15-17) and a correlator (25), said predictor being responsive to the delta coded values $x$ from the generating means for predicting a value $x$ at the array location $(i,j)$ based upon previous values $x_1, x_2, x_3, x_4, x_5$ at corresponding locations $(i-1,j-1),(i-1,j),(i,j-1),(i-1,j+1),(i,j-2)$ according to the relation:

$$\bar{x} = \bar{x}_3 x_2 + x_1 x_2 \overline{(\bar{x}_4 x_5)} + x_1 \bar{x}_3 \overline{(\bar{x}_4 \bar{x}_5)} + (x_2 + x_3) x_1 \overline{(\bar{x}_4 x_5)} + x_4 \bar{x}_5 (- x_2 x_3 + \bar{x}_2 \bar{x}_3);$$

the correlator generating a value $y$ correlating the actual $x$ and predicted values $x$ according to the relation $y = x \oplus x$; and
    means (29) for variable length encoding runs of like consecutive values of $y$ from the correlator.

6. An apparatus for compressing an $m \times n$ array of delta coded points, the location of each point being defined as an ordered pair $(i,j)$ for $1 \leq i \leq m$ and $1 \leq j \leq n$, comprising:
    a delta coder (3) for generating delta coded values $x$;

a source (1) of gray scale image data in row major order;

means for serially reading the source in consecutive raster scan lines and applying it to the delta coder resulting in the generation of delta coded values of the array in row major order;

an exhausive, non-linear causal predictor stage (14) comprising a predictor (15–17) and a correlator (25), said predictor being responsive to the delta coded values $x$ from the coder (3) for predicting a value $\overset{+}{x}$ at the array location $(i,j)$ based upon previous values $x_1, x_2, x_3$ at corresponding locations $(i-1, j-1), (i-1, j), (i, j-1)$ according to the relation:

$$\overset{+}{x} = \bar{x}_3 x_2 + \bar{x}_3 x_1 + x_1 x_2;$$

the correlator generating a value $y$ correlating the actual $x$ and predicted values $x$ according to the relation $y = x \oplus x$; and means (29) for variable length encoding runs of like consecutive values of $y$ from the correlator, said means including a run-length encoder stage using a variable word length, which is a multiple of subwords of length L whose $2^L$ power possible states are divided into two mutually exclusive, unequal groups such that $L = \log_2(p+r)$ bits, where $p$ is the number of states in the lowest order subwords and $r$ is the number of states in successive higher and highest order subwords.

* * * * *